US009251043B2

(12) United States Patent
Bogsanyi et al.

(10) Patent No.: US 9,251,043 B2
(45) Date of Patent: *Feb. 2, 2016

(54) MANAGED RUNTIME ENABLING CONDITION PERCOLATION

(71) Applicant: INTERNATIONAL BUSINESS MACHINES CORPORATION, Armonk, NY (US)

(72) Inventors: Francis J. D. Bogsanyi, Ottawa (CA); Graham A. Chapman, Nepean (CA); Gavin Rolleston, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/072,255

(22) Filed: Nov. 5, 2013

(65) Prior Publication Data
US 2014/0281711 A1 Sep. 18, 2014

Related U.S. Application Data

(63) Continuation of application No. 13/804,698, filed on Mar. 14, 2013.

(51) Int. Cl.
G06F 11/36 (2006.01)
G06F 9/00 (2006.01)
G06F 11/07 (2006.01)

(52) U.S. Cl.
CPC ............ *G06F 11/3668* (2013.01); *G06F 9/00* (2013.01); *G06F 11/0715* (2013.01); *G06F 11/0778* (2013.01)

(58) Field of Classification Search
CPC ............ G06F 11/0715; G06F 11/0778; G06F 11/3636; G06F 11/0793
See application file for complete search history.

(56) References Cited

U.S. PATENT DOCUMENTS 7,003,778 B2 2/2006 Sokolov
7,478,387 B2 1/2009 Abelite et al.
(Continued)

FOREIGN PATENT DOCUMENTS

EP 2428892 A2 3/2012
WO 2011081719 A2 7/2011

OTHER PUBLICATIONS

Anonymous, "Exceptions in Managed Threads," Microsoft Corporation, pp. 1-4, retrieved Mar. 14, 2013, <http://msdn.microsoft.com/en-us/library/ms228965.aspx>.

*Primary Examiner* — Jigar Patel
(74) *Attorney, Agent, or Firm* — Law Office of Jim Boice

(57) ABSTRACT

A method, apparatus, and/or computer program product protects a managed runtime from stack corruption due to native code condition handling. A native condition handler, which is associated with a managed runtime, percolates a condition. A condition handler of the managed runtime receives notification of the condition in a native code portion, and the condition handler of the managed runtime marks a thread associated with the condition. Responsive to a determination by the native code handler to resume execution of the marked thread by either call back into or a return to the managed runtime, the managed runtime determines whether a request is associated with the marked thread. Responsive to a determination that the request is associated with the marked thread, the managed runtime performs diagnostics and the managed runtime is terminated.

7 Claims, 5 Drawing Sheets

(56) References Cited

U.S. PATENT DOCUMENTS 8,074,116 B2  12/2011  Pardoe et al.
2010/0262814 A1  10/2010  Pardoe et al.
2011/0087926 A1*  4/2011  Arnold et al. ............... 714/38.1

* cited by examiner

MANAGED RUNTIME ENABLING CONDITION PERCOLATION

BACKGROUND

This disclosure relates generally to exception handling in a data processing system and more specifically to a managed runtime percolation of a condition from a native environment in the data processing system.

Operating systems provide models and application programming interfaces to enable software applications to handle exceptional conditions. Such exceptional conditions may be asynchronous, for example, an interruption requested from an operator console, or synchronous, for example, an attempted execution of an illegal instruction by a portion of the software application or other code associated with the operation of the software application.

General models of condition handling supported by different operating systems include a POSIX® signal handling mechanism, whereby signal handlers are registered process-wide as used in a UNIX® operating system and a stack-based condition/exception handling, as provided in a Microsoft® Windows® and an IBM® z/OS® Language Environment® whereby handlers are registered for a specific stack frame on a stack associated with a particular thread and invoked in a LIFO order.

Managed runtimes, such as the Java® Virtual Machine, leverage host operating system condition handling mechanism as well as integrate with native code (e.g. C, C++ or assembly modules) that may also leverage the host operating system condition handling. When an operating system provides stack-based condition handling, upon notification of a condition, a condition handler may choose to terminate the process; continue execution from the point of interruption, as if the condition had not occurred; continue execution at an arbitrary location; or percolate the condition to allow other condition handlers in the stack a chance to respond to the condition.

Multi-threaded managed runtimes maintain runtime state information on a native stack and may evaluate managed code using a separate execution stack. For example, an implementation of a Java Virtual Machine maintains runtime state information in a single native stack frame per call-in to Java. The one or more Java stack frames are described on a separate native stack.

A crash typically occurs in computing in a computing environment when hardware or software in the form of a program (for example, an application, portion of an application or operating system), ceases to function correctly. The failing program that crashed often exits after encountering a severe error or may cease to function and exhibit a state that is described as a freeze or hang until a diagnostic reporting service documents details of the respective crash.

When a crash occurs in a native environment associated with a native stack frame, resulting in a condition in a native code portion, a most recently registered native handler will handle the condition. The condition handler in the managed runtime frame, a Java frame in the current example, is not aware of the condition and is not affected.

In another example, when the crash occurs in one native stack frame and is handled by a condition handler in a lower stack frame, the lower condition handler can resume execution in the original frame that experienced the crash. However in this scenario, it is not certain the handler will resume execution in the original frame or some other stack frame.

A first solution is to terminate the process when an unexpected native exception or condition is detected by the managed runtime (for example, a SEGFAULT in code that is not managed by the runtime). This solution, for example, is implemented by a Microsoft Common Language Runtime. A second alternative solution also terminates the managed runtime, but without terminating the native operating system process, and performs a cleanup and restart of the managed runtime.

A limitation of the described solutions is a localized problem in native code (for example, an unhandled divide-by-zero) results in a termination of the entire process rather than a single particular thread experiencing the exception. Similarly, a technique of another example results in a termination of the entire managed runtime rather than a single thread. In a multi-tenant environment, implementation of either described solution typically results in a sudden termination of many unrelated applications or processes.

When a failure occurs causing a condition in a native environment and the described solutions terminate the managed runtime, there is also a loss of all potential diagnostic information, as well as interruption of other concurrent processes in the previously running managed environment.

SUMMARY

According to one embodiment, a method for protecting a managed runtime from stack corruption due to native code condition handling comprises percolating a condition by a native condition handler associated with a managed runtime, receiving notification of the condition in a native code portion by a condition handler of the managed runtime and marking a thread associated with the condition, by the condition handler of the managed runtime. The method further comprises determining, by the native code handler, whether to resume execution of the marked thread by either call back into or a return to the managed runtime and responsive to a determination to resume execution of the marked thread by either call back into or a return to the managed runtime, determining by the managed runtime whether a request is associated with the marked thread. Responsive to a determination that the request is associated with the marked thread, the method further comprises performing diagnostics by the managed runtime and terminating the managed runtime.

According to another embodiment, a computer program product for protecting a managed runtime from stack corruption due to native code condition handling comprises a computer recordable-type storage device containing computer executable program code stored thereon. The computer executable program code comprises computer executable program code for percolating a condition by a native condition handler associated with a managed runtime; computer executable program code for receiving notification of the condition in a native code portion by a condition handler of the managed runtime; computer executable program code for marking a thread associated with the condition, by the condition handler of the managed runtime; computer executable program code for determining, by the native code handler, whether to resume execution of the marked thread by either call back into or a return to the managed runtime; computer executable program code responsive to a determination to resume execution of the marked thread by either call back into or a return to the managed runtime, for determining by the managed runtime whether a request is associated with the marked thread; computer executable program code responsive to a determination the request is associated with the marked thread, for performing diagnostics by the managed runtime; and computer executable program code for terminating the managed runtime.

According to another embodiment, an apparatus for protecting a managed runtime from stack corruption due to native code condition handling, comprises a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric. The processor unit executes the computer executable program code to direct the apparatus to percolate a condition by a native condition handler associated with a managed runtime, receive notification of the condition in a native code portion by a condition handler of the managed runtime and mark a thread associated with the condition, by the condition handler of the managed runtime. The processor unit further executes the computer executable program code to direct the apparatus to determine, by the native code handler, whether to resume execution of the marked thread by either call back into or a return to the managed runtime and responsive to a determination to resume execution of the marked thread by either call back into or a return to the managed runtime, determine by the managed runtime whether a request is associated with the marked thread. Responsive to a determination the request is associated with the marked thread, the processor unit further executes the computer executable program code to direct the apparatus to perform diagnostics by the managed runtime and terminate the managed runtime thereafter.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
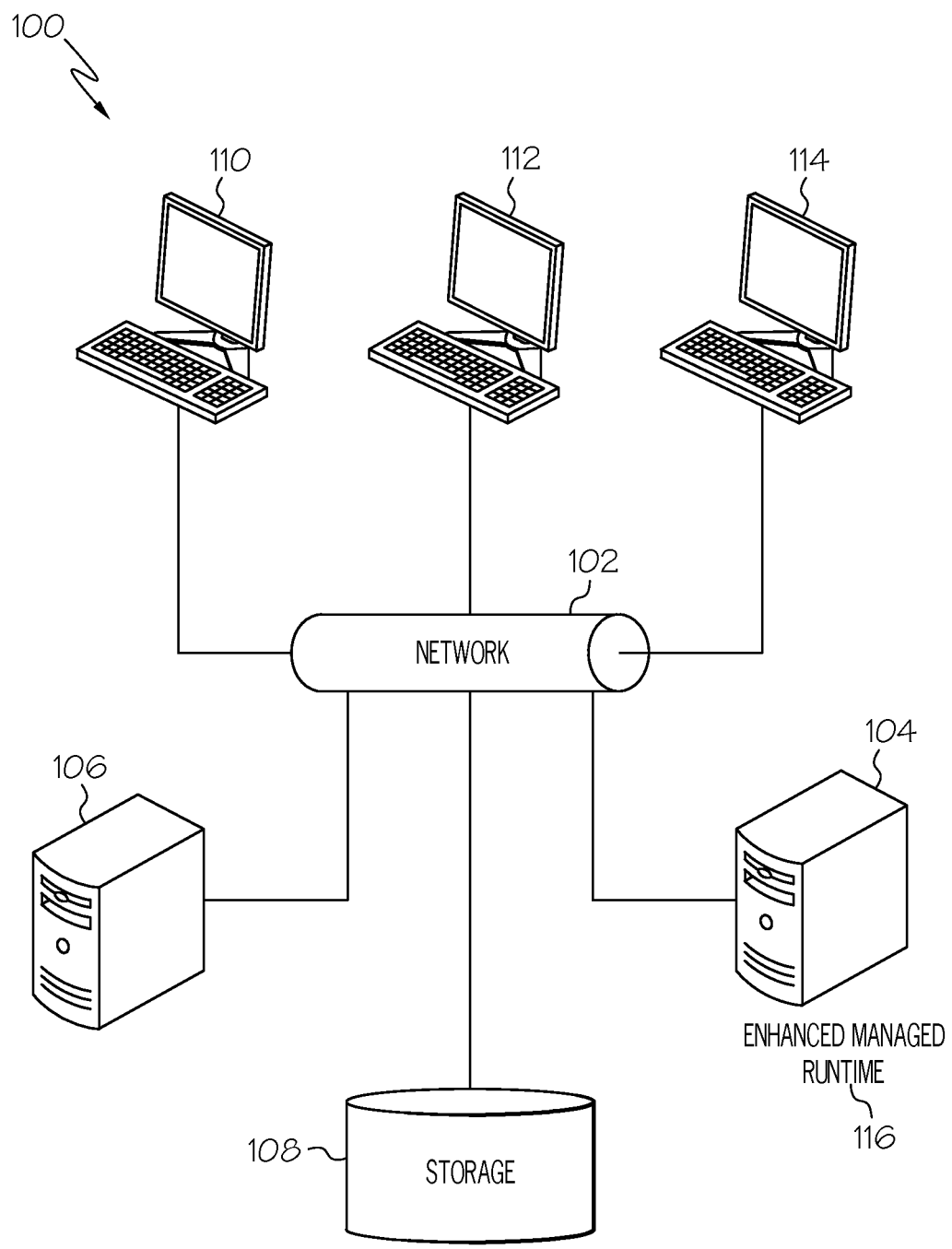
FIG. 1 is a block diagram of an exemplary network data processing system including an enhanced runtime operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device or computer readable storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
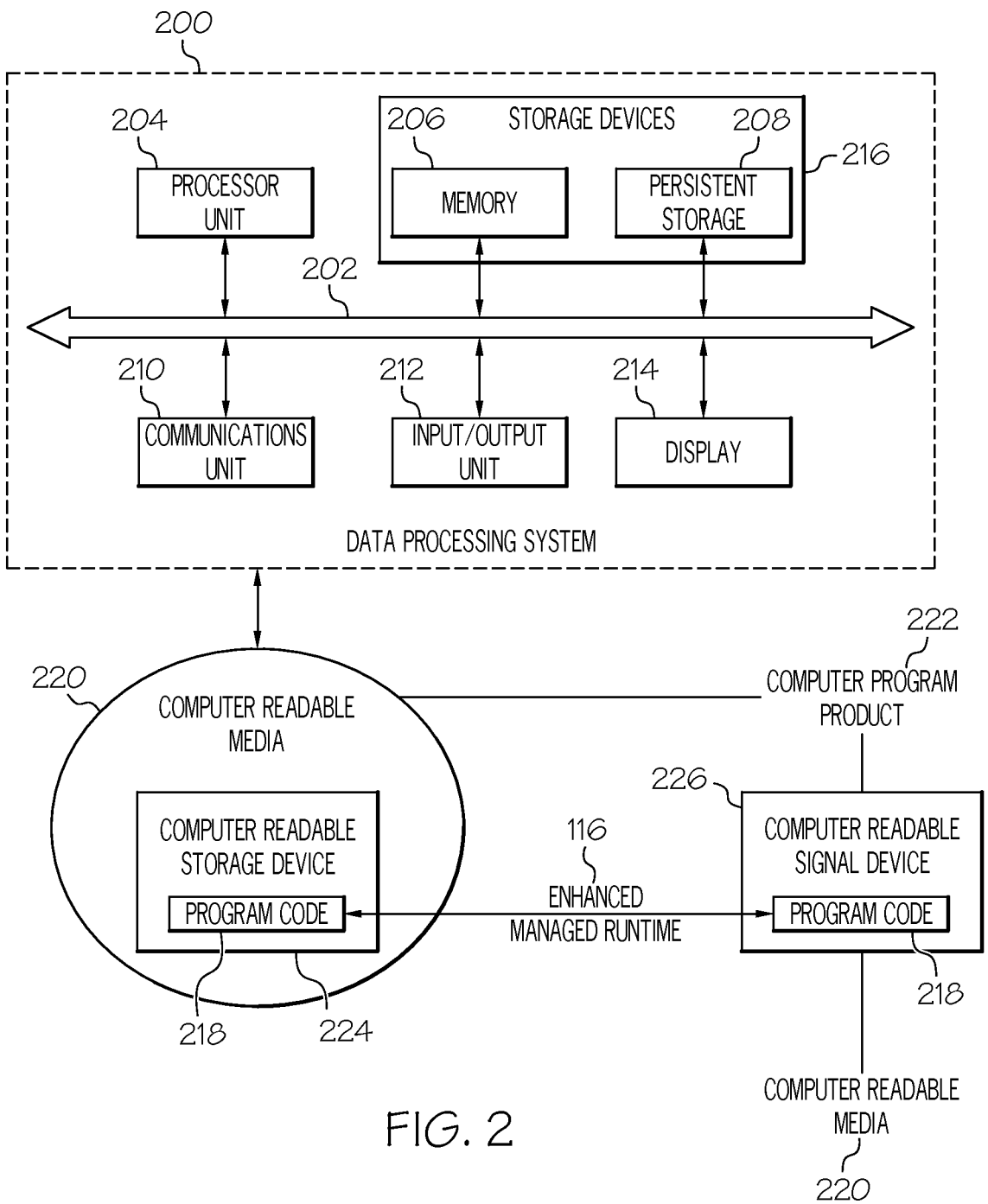
FIG. 2 is a block diagram of an exemplary data processing system including an enhanced runtime operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown Enhanced managed runtime 116 is shown in association with server 104 but may be accessed from any of the described clients and servers through network 102. Operations using services of enhanced managed runtime 116 may therefore be used locally or remotely. For example a native method on server 106 may use enhanced managed runtime 116 on server 104 and conversely enhanced managed runtime 116 may use services of a native environment on server 106.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2, a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage device, such as memory 206 or persistent storage 208.

Program code 218, representing enhanced managed runtime 116, is located in a functional form on computer readable storage media 220 that is selectively removable and may be loaded onto or transferred to data processing system 200 for execution by processor unit 204. Program code 218 and computer readable storage media 220 form computer program product 222 as in the example. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable storage device 224. Computer readable storage device 224 does not encompass a propagation media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 representing enhanced managed runtime 116, may be downloaded over a network to persistent storage 208 from another device or data processing system for use within data processing system 200. For instance, program code stored in computer readable storage device 224 in a server data processing system may be downloaded over a network from the server to data processing system 200. The data processing system providing program code 218 may be a server computer, a client computer, or some other device capable of storing and transmitting program code 218 in the form of computer readable signal media 226. Computer readable signal media 226 represents a propagation media.

Using data processing system 200 of FIG. 2 as an example, a method for protecting a managed runtime from stack corruption due to native code condition handling is presented. Processor unit 204 percolates a condition, for a native condition handler associated with a managed runtime, and receives notification of the condition in a native code portion, using a condition handler of the managed runtime and marks a thread associated with the condition, by the condition handler of the managed runtime. Processor unit 204, using the native code handler, determines whether to resume execution of the marked thread by either call back into or a return to the managed runtime. Responsive to a determination to resume execution of the marked thread by either call back into or a return to the managed runtime, processor unit 204 operating as the managed runtime, determines whether a request is associated with the marked thread. Responsive to a determination that the request is associated with the marked thread, processor unit 204 as the managed runtime performs diagnostics and terminates the managed runtime.

Embodiments of the disclosure protect the managed runtime state when a native condition or exception occurs in code outside control of the managed runtime control. For example, when a crash occurs in a first native function but is handled by a condition handler for a second native function there exists a requirement that the execution does not resume in the second native function and attempt to either return back to the managed runtime or call back into Java. Either scenario would result in corruption of the managed runtime state for the thread because the managed runtime expects control to return by way of return from the first native function. A similar result occurs when the condition handler is for the first native function.

In this scenario, when a JVM frame occurs between a native frame involved in a crash and the handling frame, then an embodiment of the disclosure will mark the failed thread as "bad", although if the handler chose to resume execution in the crashing frame corruption would not be inevitable. The embodiments of the disclosure therefore enable a conservative response in this instance because the managed runtime does not know a priori the native handler will not resume execution in some other stack frame. The conservative approach of marking the thread enables the managed runtime to be aware of a potentially harmful action associated with the marked thread, detect when the harmful action is presented and respond at that time.

Figure 3:
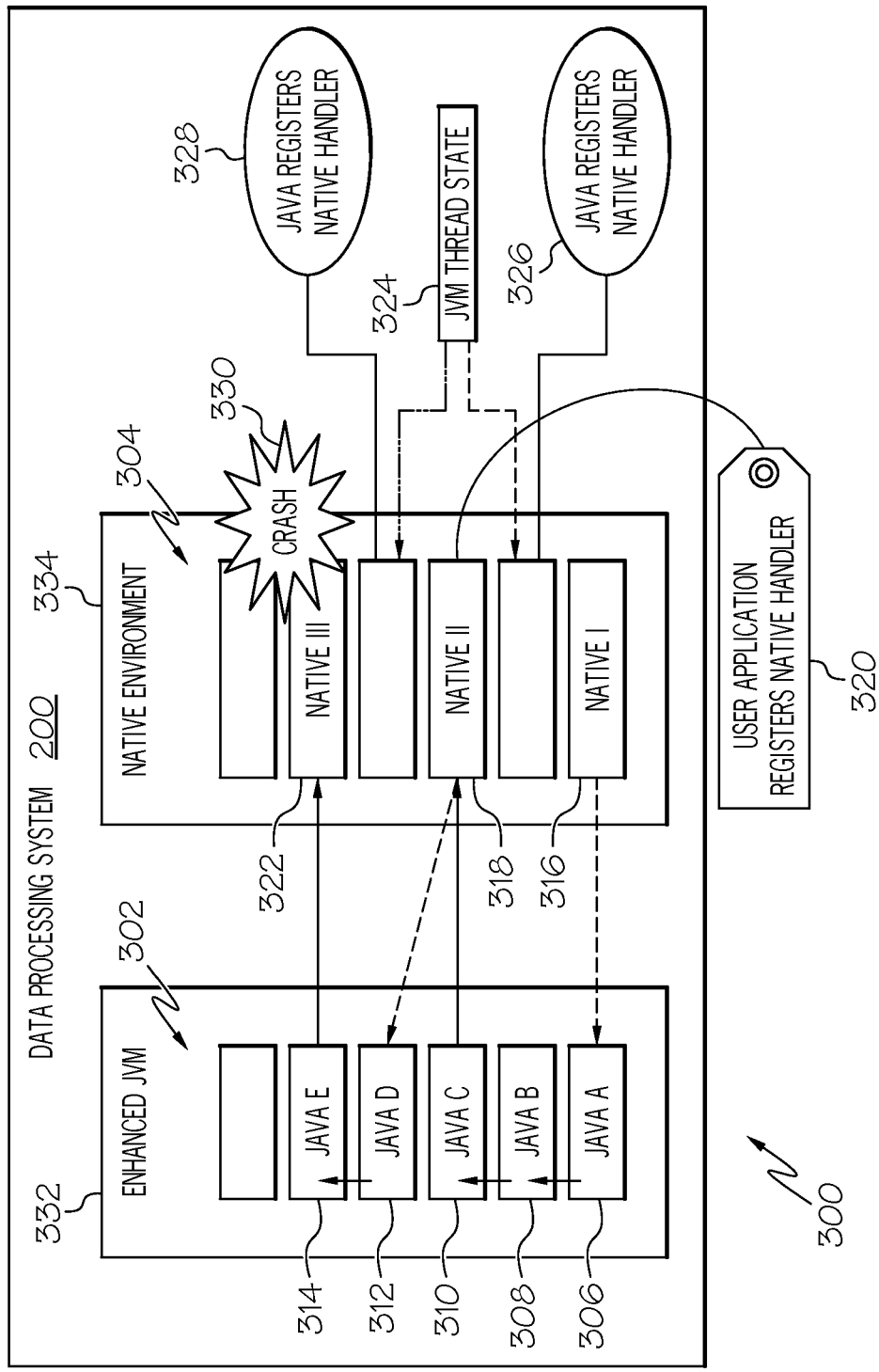
FIG. 3 is a block diagram of a condition percolation system operable for various embodiments of the disclosure.

With reference to FIG. 3 a block diagram of a condition percolation system operable for various embodiments of the disclosure is presented. Condition percolation system 300 is an example of an enhanced managed runtime using an embodiment of the disclosed process.

Condition percolation system 300 leverages underlying support of a data processing system such as that of server 104 of network of data processing system 100 of FIG. 1 or data processing system 200 of FIG. 2. Condition percolation system 300 includes an enhanced managed runtime, in this example enhanced JVM 332 with an associated memory data structure of Java stack 302.

A condition is percolated when a condition handler declines to handle the respective condition. User-written condition handlers, for example, can be written to act on a particular condition, but percolate all other conditions. During percolation, the stack frames are traversed in a downward direction to reach the next condition handler associated with the current stack frame. This next condition handler can be either the first condition handler in a queue of user-established condition handlers, or the language-specific condition semantics. Condition handling may also occur with the most recently established condition handler associated with the calling stack frame.

When native code portions are executed in conjunction with code of the managed runtime, an associated memory data structure of native stack 304 of native environment 334 is included. Enhanced JVM 332 provides a capability to identify when an exception condition is raised in association with a native code execution in native environment 334 used in conjunction with enhanced JVM 332. In response to identifying when such a condition arises, enhanced JVM 332 also has a capability to mark a particular thread, which encountered the condition. A mark is formed using a variety of techniques including setting a specific bit within a thread specific data structure such as that already used to maintain thread unique information.

In the example, a sequence of operations occurs in which NativeI 316 calls into enhanced JVM 332 by calling Java method JavaA 306. In response to the call, enhanced JVM 332 builds a native stack frame to store state information and to register a native handler 326 for this frame. JVM thread state 324 contains a reference to this stack frame of native handler 326. The native stack frame contains enhanced JVM 332 state information relating to JavaA 306, JavaB 308 and JavaC 310.

A next sequence occurs in which JavaA 306 calls JavaB 308, which in turn calls JavaC 310. JavaC 310 then calls out to native II 318. In response, native II 318 registers a native handler 320. Native handler 320 in this example is a user application initiated native handler.

Native II 318 calls back into enhanced JVM 332 calling the Java method JavaD 312. In response to the call, enhanced JVM 332 builds a native stack frame to store state information for JavaE 314 and to register a handler 328 for this frame. The JVM thread state contains a reference to this stack frame. The native stack frame contains JVM state information relating to JavaD 312, and JavaE 314.

JavaD 312 calls JavaE 314. JavaE 314 then calls nativeIII 322. Crash 330 occurs within the processing of nativeIII 322. Due to the resulting crash 330 in nativeIII 322, a handler in enhanced JVM 332 below the stack frame of nativeIII 322 generates a diagnostic and percolates. NativeII 318 handler in the form of native handler 320 handles the condition from nativeIII 322 and chooses to either resume execution by calling back into JavaD 312 or by returning to JavaC 310. Normally either response would be problematic. However in this example using an embodiment of enhanced JVM 332, the condition of crash 330 has resulted in the particular thread of the example on which the crash occurred being flagged as "bad", by a condition handler of the enhanced JVM 332 with the flag (a specific bit in this example) in JVM thread state 324 set to a value representative of "on" (for example, to a value of 1). Because the flag for the thread is set as "on", enhanced JVM 332 prevents the thread from calling back into JavaD 312 or returning to JavaC 310 after being resumed. Updating a data structure, JVM thread state 324 stores thread unique information including indicia, wherein the indicia is set to a first value indicative of the thread that owns the stack associated with the condition (for example, the bit is set to 1) and a second value indicative of the thread that owns the stack not associated with the condition (for example, the bit is set to 0).

Figure 4:
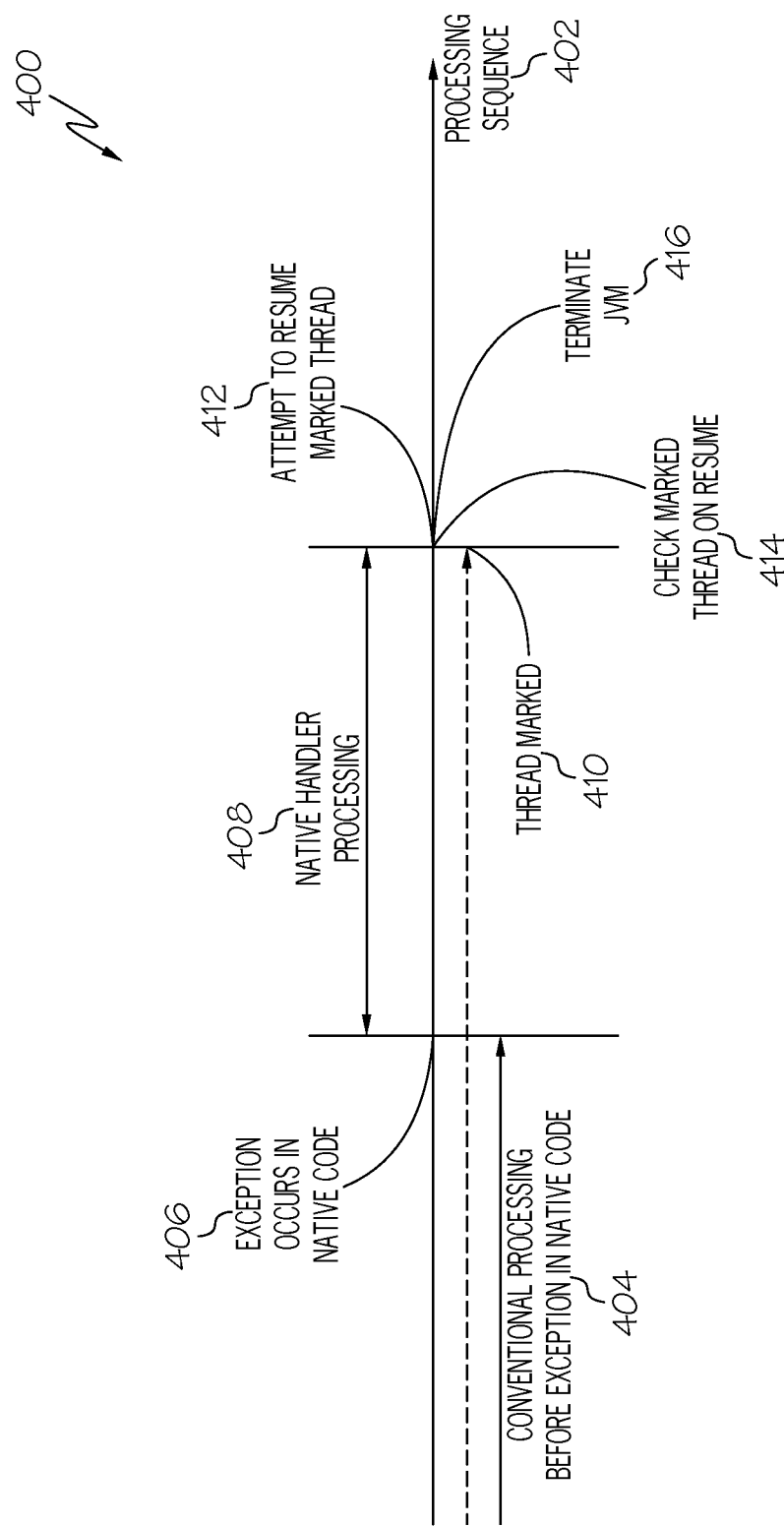
FIG. 4 is a schematic diagram of a condition percolation process operable for various embodiments of the disclosure.

With reference to FIG. 4 a schematic diagram of a condition percolation process operable for various embodiments of the disclosure is presented. Condition percolation process 400 is an example of using condition percolation system 300 of FIG. 3 as an example of an enhanced managed runtime.

An embodiment of condition percolation process 400 provides protection to a managed runtime state when a condition or exception occurs in native code outside of the control of the managed runtime. Native code supplied with a JVM or by an application using the JVM is handled in a similar manner. In the example, processing sequence 402 represents a flow of operation, which includes both Java methods and native functions in operation. Conventional processing before an exception in native code 404 represents a portion of processing sequence 402 in which a mixture of Java methods and native code functions may occur. When an exception occurs in native code 406, for example, a crash occurs in the native code function.

In response, control is passed to a registered or otherwise, condition handler for the native code, in native handler processing 408. The native handler thus has an opportunity to perform diagnostics, which may be specific to the situation or application or a combination thereof. The native handler also may use the opportunity to quiesce the processing in the native environment or the JVM or both.

In the event the native handler chooses to percolate the condition, the enhanced managed runtime receives notification of the condition on the thread because either the JVM condition handler is next in a sequence of downward traversal of the stack frames or called explicitly. As a result of the percolation to the JVM, thread marked 410 occurs. The notification occurs because either a native condition handler identified for use with the thread which encountered the severe error cannot resolve the condition or otherwise contain the error (for example, a work around) or a condition handler does not exist and the JVM condition handling is called.

A requirement remains in that the execution cannot resume in the native code and attempt to either return to the calling Java method or to call back into Java when a condition is percolated past the JVM frames. Either scenario results in corruption of a managed runtime state because the managed runtime expects control to be returned using a return from the native function to the corresponding Java method that invoked the call to the native code. The managed runtime is also therefore in an undefined state because normal operation cannot be assumed.

Enhanced JVM 332 of FIG. 3, for example, recorded when a JVM handler percolates a condition when thread marked 410 occurred. Attempt to resume marked thread 412 occurs prompting the enhanced JVM to check the flag value of the marked thread on resume 414. This check is performed each time the enhanced JVM is called into, or returned back to, to determine whether a condition associated with the particular thread was previously percolated. In response to a determination that a condition was previously percolated, the enhanced JVM terminates JVM 416.

Figure 5:
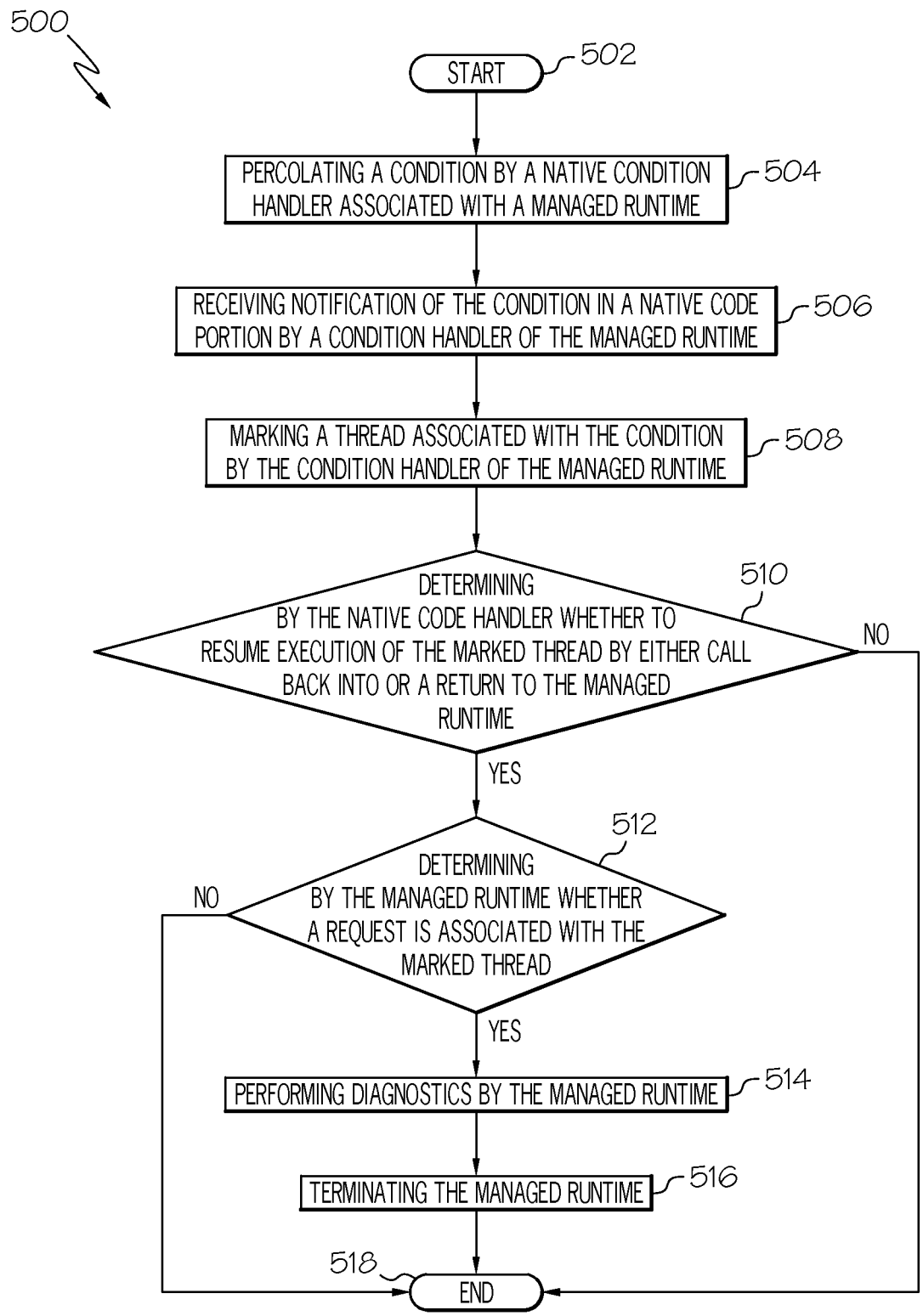
FIG. 5 is a flow chart of a condition percolation process operable for various embodiments of the disclosure.

With reference to FIG. 5 a flow chart of a condition percolation process operable for various embodiments of the disclosure is presented. Condition percolation process 500 is an example of using condition percolation system 300 of FIG. 3 as an example of an enhanced managed runtime.

Process 500 begins (step 502) and a native condition handler associated with the managed runtime percolates a condition (step 504). The native condition handler cannot resolve the problem or has simply deferred processing to the JVM condition handler through the percolation process. The managed runtime receives notification of the condition in a native code portion through percolation (step 506). The notification occurs because either a native condition handler identified for use with the thread which encountered the severe error cannot resolve the condition or otherwise contain the error (for example, a work around) or a condition handler does not exist and the JVM condition handling is called. The values of conditions vary according to severity of the problem. A condition with a severity value of 0 or 1 is typically associated with an input/output operation completion, or normal processing events. A condition with a severity value of 2 and greater is typically associated with a sever error representative of a termination or crash of an application code portion. In a typical instance, the JVM simply percolates the severity 0, or severity 1 conditions without setting a bit in the thread unique data structure to indicate a "bad" thread, because these conditions are expected in normal execution. This behavior is often of a condition-handling model. Therefore the JVM need not set the bit to indicate a "bad" thread every time a condition handler the thread registered (or registered for use with the thread) is invoked.

A condition handler of the managed runtime marks the thread of the condition (step 508). Marking may be achieved, in one example, by the condition handler of the managed runtime setting a bit on, representative of an exception occurrence, in the thread state information maintained for each thread in a managed runtime.

Process 500, using the native code handler, determines whether to resume execution of the marked thread by either a call back into or a return to the managed runtime (step 510). Responsive to a determination that the native code handler resumes execution of the marked thread by either a call back into or a return to the managed runtime, process 500 determines, using the managed runtime, whether a request is associated with the marked thread (step 512). Responsive to a determination that the request is associated with the marked thread, the managed runtime performs diagnostics (step 514). Process 500 terminates the managed runtime (step 516) and process 500 terminates thereafter (step 518). The overall state of the managed runtime is undefined at this point because of the state of various processes, which may be dependent upon or interdependent with the marked thread, is questionable.

Responsive to a determination that the native code handler does not resume execution of the marked thread by either a call back into or a return to the managed runtime, process 500 terminates thereafter (step 518). Responsive to a determination that the request is not associated with the marked thread, process 500 terminates thereafter (step 518) and normal processing continues.

When a condition handler for a stack frame associated with a managed runtime, as in the example of enhanced JVM 332 of FIG. 3, has chosen to percolate a condition, a condition handler of the managed runtime marks the thread that owns the stack prohibits subsequent execution of code, by that particular thread to prevent an attempt to either return to the calling Java method or to call back into Java.

A native code handler may also handle the condition associated with the exception so that the JVM is unaware of a condition in the native code. Using an embodiment of enhanced JVM 332 of FIG. 3 enhances serviceability by avoiding difficult-to-debug scenarios involving condition resumption and stack corruption. Dumping diagnostics enables user applications to perform custom diagnostics generation using the disclosed process safely. This capability is particularly relevant to the interoperability of Java and COBOL runtime environments, where legacy COBOL applications, may replace COBOL modules with Java function.

For example, in an example in which COBOL module_A calls COBOL module_B, which in turn calls COBOL module_C. In normal execution, COBOL module_C might trigger a condition, for example a divide-by-0 exception, which gets percolated downward to a condition handler in module_A. The condition handler of module_A could respond by invoking module_C (via module_B) once again. In this scenario, replacing module_B with a corresponding Java method creates a problem. When the condition handler for module_A attempts to call back into Java to invoke module_C, the JVM is in a state expecting COBOL module_C to return back to Java. Therefore, the condition handler for module_A would be illegally re-entering the JVM. However using an embodiment of enhanced JVM 332 of FIG. 3 protection for this type of occurrence is provided through the use of the marked thread.

When the flag is set on the particular thread, (in the examples a bit setting for the marked thread) the enhanced JVM is aware of a previously percolated condition. An attempt to resume use of the particular thread with the flag set on causes the enhanced JVM to be in an unstable condition and eventually terminate. The flag may also be referred to as an indicium, wherein the indicium has one of a first value and a second value. The first value and second value are a representative setting of the bit (in the example of a bit used as the flag) representing the thread as either being "good" (normal mode) or "bad" (percolated error mode). Setting the first value to be "on" and having a value of 1 is indicative of the thread that owns the stack associated with the error condition and setting the second value to be "off" and having a value of 0 is indicative of the thread that owns the stack not being associated with the error condition and reflective of a normal state.

An enhanced managed runtime, in this example enhanced JVM 332 of FIG. 3, provides a capability to safely percolate the exception condition. The enhanced JVM provides a capability of, responsive to determining when a fatal exception occurs, rather than terminating the JVM, marking the thread on which the exception occurred as "bad" and percolating the exception to a native condition handler when one exists. In contrast with previous solutions which either kill the whole process, or the entire managed runtime immediately, a conditioner handler of the enhanced JVM simply marks the thread as "bad" and queries the thread unique information for each thread prior to executing or continuing to execute a particular thread to prevent an attempt to either return to the calling Java method or to call back into Java.

Using the capability of the enhanced JVM enables the native exception handlers to provide information that would not otherwise be available. Effectively a bit in a thread unique data structure, which data structure often exists for other purposes, marks this thread as "bad". The enhanced JVM accordingly ignores the marked thread temporarily and does not allow the marked thread to execute any bytecodes, by either a return to the calling Java method or to a call back into Java, which therefore avoids additional potential crashes.

The JVM is terminated when the marking of the thread is "bad", and when a marked thread calls a Java method or calls back into Java to resume execution. This action is necessary because the JVM does not support breaking a Java call chain. As required, when execution is interrupted by a condition, execution must resume at the same point on the Java stack (whether it be a Java method or native method). Enabling the native exception handler to gain control provides a capability to attempt to resume execution at a point that would otherwise break the Java call chain.

The JVM relies on information stored in native stack frames of the thread. When the native exception handler resumes execution, the respective native stack frames could also be overwritten. The state information is not only required for the particular thread to execute Java code, the state information is also required to walk the stack of the thread. For example, a Garbage Collection routinely walks the stacks of threads, as do reliability and serviceability diagnostics, when dumping the Java stacks of all threads.

Currently, a native condition handler is expected to terminate the JVM once the native exception handlers have completed respective error handling; however, by only marking the thread as "bad", a remainder of the JVM may continue executing normally and enables the native exception handler to determine a course of action. For example, the native exception handler may put the "bad" thread to sleep and let other threads continue running to completion. However, when the native handler does not behave as expected and tries to resume execution of the "bad" thread, a check of the bit on the "bad" thread ensures an orderly termination of the JVM with appropriate messages.

The enhanced JVM uses the bit on the thread as a marker to the JVM as a whole, to ignore the thread. This is necessary because otherwise other threads in the JVM that tried to operate on or in combination with the "bad" thread might cause the JVM to crash preventing a native exception handler from running and obscuring the original failure. For example, when Garbage Collection occurs and the Garbage Collector attempts to walk the thread stack associated with thread previously marked "bad", a crash could occur.

Garbage Collection, a Just In Time compiler, and reliability and serviceability diagnostics are examples that depend on or use a stack walker to walk a Java stack of the thread. The stack walker is also therefore enhanced to examine this bit, and will not walk any thread when the bit is set. Therefore, overwriting stack frames containing JVM state information is no longer a problem and a crash that could happen when Garbage Collection or other stack walking occurs is avoided.

Previous offerings of exception handling provide a variety of techniques including an enhancement to an exception handling system provided by an operating system whereby application code may register handlers to receive notification of exceptions before normal exception processing occurs. However, a mechanism by which a language runtime system may protect itself from stack corruption due to native code condition handling as in an embodiment of this disclosure is not evident.

In another example of previous offerings, an enhancement to an exception handling mechanism is provided by a language runtime system whereby a set of potentially more-dangerous-than-usual conditions is identified and managed more carefully than typical conditions. For example, a condition related to executing an invalid instruction is considered more dangerous than a time out of a network operation. However, using a technique of this type requires application programmers to be more explicit about specific intent to handle dangerous exceptions.

Another example of previous offerings provides a mechanism for identifying a distinguished set of condition types and marking instances of such types, and another mechanism for special handling of conditions so marked instead of proceeding with normal condition handling. In contrast, an embodiment of the disclosed process does not interfere with normal condition handling and does not distinguish between native condition types. Rather the embodiment of the presently disclosed process observes unhandled conditions and prohibits further execution of managed code on a thread that has encountered such a condition.

In another example of previous offerings, a leveraging a language runtime standard exception handling facility is provided. This example uses a standard try-catch block to handle exceptions raised within a nested atomic block and rolls back the nested transaction when the try-catch block catches an exception. In contrast, the embodiment of the presently disclosed process leverages the standard structured condition handling mechanism of an operating system to protect a managed runtime thread stack from corruption due to unhandled or improperly handled native conditions.

In another example of previous offerings, a mechanism for implementing structured exception handling for threads that execute on hardware resources, but which are unknown to the operating system is described. Such threads are associated with a thread that is managed by the operating system, and exceptions/conditions on such threads are handled by an asynchronous transfer of control to the associated operating system thread, which in turn either implements exception handling on behalf of the originating thread or arranges transfer of control for the originating thread to an appropriate exception handling routine. This example describes interactions between threads unknown to an operating system and a thread known to the operating system in order to implement a structured exception handling facility. In contrast, an embodiment of the presently disclosed process protects a managed runtime state from corruption due to native condition handling.

In another example of previous offerings, a mechanism to implement Java exception handling semantics without uses a native execution stack. However, this example does not relate to interactions between native condition handling semantics and the managed runtime, as in an embodiment of the disclosed process.

Using an embodiment of the enhanced managed runtime enables a native condition handler to let threads continue to run after percolating. However, there are issues with threads holding locks, such as threads that trigger an exception, which poses the risk of allowing the JVM to continue running Allowing threads to continue running needs to be handled carefully using thoughtful design and management in the application and specific native code handlers. For example, when locks are held by the thread that has been marked, other threads needing the held locks will deadlock. Thus, releasing the locks may leave data in an inconsistent state. This results in a managed runtime condition that is undefined.

Depending on the type of the native condition, or where the condition occurred (for example in user code or managed runtime code), the managed runtime may not be able to continue running, as internal structures of the managed runtime may be corrupted resulting in another condition from another thread. The thread on which the condition occurred may be critical to the application, which may stop the application from performing any useful function. The native handler to which the condition is percolated would accordingly only be able to continue using the managed runtime in specific circumstances, which would have to be carefully validated by the implementer of the native handler. Under these special circumstances the managed runtime could be re-entered using a different thread.

Rather than immediately terminating the managed runtime or process, the enhanced managed runtime is enabled to handle a condition (for example, to collect service information) followed by percolating the condition down to another handler (when no handler is available, reaching a stack frame 0 and an underlying operating system), while protecting the managed runtime from causing further undefined and possibly hard to diagnose conditions when the handler tries to resume execution of the managed runtime.

The enhanced managed runtime enables language interoperability scenarios that would otherwise be impossible, thereby providing value to platforms with thread-scoped exception mechanisms. For example, Java is enabled to replace Cobol modules while maintaining the same semantics. The enhanced managed runtime enables the JVM to let the process, which invoked or created the JVM, clean up a respective state when a crash is induced on a Java thread.

Thus is presented in an illustrative embodiment a method for protecting a managed runtime from stack corruption due to native code condition handling. The method percolates a condition by a native condition handler associated with a managed runtime, receives notification of the condition in the native code portion by a condition handler of the managed runtime and marks a thread associated with the condition, by a condition handler of the managed runtime. The native code handler determines whether to resume execution of the marked thread by either call back into or a return to the managed runtime. Responsive to a determination to resume execution of the marked thread by either call back into or a return to the managed runtime, the managed runtime determines whether a request is associated with the marked thread. Responsive to a determination the request is associated with the marked thread, the managed runtime performs diagnostics and terminates.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable storage device having computer executable instructions stored thereon in a variety of forms. Examples of computer readable storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for protecting a managed runtime from stack corruption due to native code condition handling, the method comprising:
   percolating a condition by a native condition handler associated with a managed runtime;
   receiving, by a condition handler of the managed runtime, notification of the condition in a native code portion;
   marking, by the condition handler of the managed runtime, a thread associated with the condition as a marked thread;
   determining, by the native code handler, whether to resume execution of the marked thread by either a "call back into" or a "return to" the managed runtime;
   responsive to a determination to resume execution of the marked thread by either calling back into or returning to the managed runtime, determining, by the managed runtime, whether a request is associated with the marked thread;
   responsive to a determination that the request is associated with the marked thread, performing diagnostics by the managed runtime; and
   terminating the managed runtime.

2. The method of claim 1, wherein said marking the thread associated with the condition further comprises:
   updating a data structure, wherein the data structure stores thread unique information that includes an indicium, wherein the indicium is set to a first value indicative of the thread owning a stack associated with the condition, and wherein the indicium is set to a second value indicative of the thread owning a stack that is not associated with the condition.

3. The method of claim 1, further comprising:
   ignoring any attempt to use the marked thread by the managed runtime.

4. The method of claim 1, further comprising:
   performing predetermined diagnostics, wherein the predetermined diagnostics are specific to an application; and
   quiescing processing of code in the managed runtime.

5. The method of claim 1, further comprising:
   putting the marked thread to sleep; and
   allowing threads other than the marked thread to continue running to completion.

6. The method of claim 1, further comprising:
   walking a stack of the managed runtime associated with the marked thread using an enhanced stack walker; and
   in response to the enhanced stack walker determining that a particular thread is not marked with the runtime state information, blocking a walking of the particular thread, wherein overwriting stack frames in threads containing managed runtime state information is avoided.

7. The method of claim 1, further comprising:
   prohibiting subsequent execution of code that is managed by the managed runtime.

* * * * *